United States Patent [19]

Nowak et al.

[11] 4,208,184

[45] Jun. 17, 1980

[54] DRIED PULVERULENT PRODUCTS

[75] Inventors: Rudolf Nowak, Krefeld; Kurt Dahmen, Rheydt; Eduard Barthell, Krefeld, all of Fed. Rep. of Germany

[73] Assignee: Chemische Fabrik Stockhausen & Cie, Krefeld, Fed. Rep. of Germany

[21] Appl. No.: 974,276

[22] Filed: Dec. 28, 1978

Related U.S. Application Data

[63] Continuation of Ser. No. 345,916, Mar. 29, 1973, abandoned, which is a continuation-in-part of Ser. No. 173,329, Aug. 19, 1971, abandoned.

[30] Foreign Application Priority Data

Aug. 21, 1970 [DE] Fed. Rep. of Germany ....... 2041535
Mar. 29, 1972 [DE] Fed. Rep. of Germany ....... 2215212

[51] Int. Cl.$^2$ .......................... C14C 9/00; C14C 9/02
[52] U.S. Cl. ..................................... 8/94.23; 8/94.21; 8/94.22
[58] Field of Search ................... 8/94.21, 94.22, 94.23; 426/187

[56] References Cited

U.S. PATENT DOCUMENTS

| 1,918,372 | 7/1933 | Bertsch | 8/94.23 |
|---|---|---|---|
| 2,118,308 | 5/1938 | Jaeger | 8/94.21 |
| 2,913,342 | 11/1959 | Cameron | 99/123 |
| 3,656,881 | 4/1972 | Hemwall | 8/94.23 |
| 3,809,765 | 5/1974 | Bratland | 426/187 XR |
| 3,826,610 | 7/1974 | Komarek | 8/94.22 |

FOREIGN PATENT DOCUMENTS

| 771617 | 2/1972 | Belgium | 8/94.23 |
|---|---|---|---|
| 1068251 | 11/1959 | Fed. Rep. of Germany | 8/94.21 |
| 2041535 | 2/1972 | Fed. Rep. of Germany | 8/94.23 |
| 1533247 | 7/1968 | France | 8/94.21 |

*Primary Examiner*—Dennis L. Albrecht
*Attorney, Agent, or Firm*—Sprung, Felfe, Horn, Lynch & Kramer

[57] ABSTRACT

As a leather fatting agent a solution, emulsion or dispersion of a pulverulent, free-flowing form product derived from a substance having a liquid or pasty consistency, especially fatty, oil and waxy substances, especially those prepared by drying aqueous solutions or dispersions containing these substances together with carrier compositions having the dry weight analysis of from 0.1 to 35% inorganic or organic salts, 0.1 to 90% albumin or albumin derivatives and 0.1 to 70% of mono-, oligo- or poly-saccharides or derivatives thereof; a method of fatting a leather which comprises contacting said leather with a solution, dispersion or emulsion of a free-flowing pulverulent product derived from a substance having a liquid or pasty consistency, especially fatty, oily and waxy substances and especially those substances prepared by drying an aqueous solution or dispersion containing the same, together with a carrier composition having the dry weight analysis set forth above in respect of inorganic or organic salts, albumin or albumin derivatives and mono-, oligo- or poly-saccharides or derivatives thereof.

16 Claims, No Drawings

DRIED PULVERULENT PRODUCTS

This is a continuation of application Ser. No. 345,916, filed Mar. 29, 1972, now abandoned, which is a continuation-in-part of application Ser. No. 173,329, filed Aug. 19, 1971, now abandoned.

BACKGROUND OF THE INVENTION

1. Field of the Invention

This invention is directed to fatliquoring or more particularly to leather fatting agents. This invention is particularly directed to leather fatty agents derived from free-flowing dried pulverulent products. This invention is also directed to a process for fatting a leather with a solution, emulsion or dispersion of an initially free-flowing pulverulent product derived from a liquid or paste, especially one based upon a fatty, oily or waxy substance.

2. Discussion of the Prior Art

During the treatment of leather it is common to treat the same with a chrome tanning agent. For some time after the operation of the chrome tanning, while the tan is developing, there is a slow development of acidity in the leather. Thus, after splitting and levelling, the leather is washed or treated with sodium bicarbonate, borax or some other mild alkali to remove the free acid. It has been found that the fibers of the leather can be lubricated by fatliquoring process so as to impart to the leather good strength and flexibility. In the fatliquoring operation the oils and fats employed are added to the leather in an emulsion, solution or dispersion form, preferably as an aqueous emulsion. According to theory, fatliquoring is a method of incorporating oil or fat into the leather by means of an aqueous suspension of oil or fat which remains stable at the pH of the neutralized leather. As leather is usually neutralized only on the grain and flesh surfaces and to a slight depth beneath these surfaces, the fatliquor is designed to penetrate to the depth of the effect of the neutralizing agent.

For some time now it has been known to employ numerous types of animal oils, mineral oils and vegetable oils in the fatliquoring operation. The fatliquor solutions are made up of a mixture of raw oil and a soap or sulfated oil. The soap or sulfated oil serves as a carrier for the raw oil and an emulsion is formed when the two are mixed with water in proper form so that the fatliquor is readily absorbed by the leather.

The neutralized leather is placed in a drum and may be both dyed and fatliquored in one continuous operation, or dyed first and then fatliquored. A sulfated oil—raw oil mixture is used, suitably employing between 1 and 3% of oil based on the stock wet wrung weight. The amount of water employed varies; the weight ratio of emulsion to stock may vary from 1:1 to 3:1. The leather is usually fatliquored for thirty minutes to one hour while drumming at 120° F. After fatliquoring, the stock is piled up over night and then set out to dry by various methods, such as paste drying or toggling.

It, therefore, has become desirable to provide improved fatliquoring or leather fatting substances which would penetrate deeply into the interior of the leather. Moreover, it has become desirable to provide a solid product which can be readily made into an aqueous emulsion form to be used as leather fatting agent. It has become desirably, additionally, to provide a material useful as a leather fatting agent which is readily absorbed from the solution, emulsion or dispersion and enters within the pores of the leather so treated. Still moreover, it has become desirable to provide a leather fatting solution, emulsion or dispersion in which an exceptionally high percentage of leather fatting agent contained therein is absorbed by the leather.

SUMMARY OF THE INVENTION

The above objects are accomplished by a leather fatting agent comprising a solution, emulsion or dispersion of a free-flowing pulverulent product from one or more substances having a non-solid consistency. More particularly, the leather fatting agent of the present invention comprises an aqueous solution, emulsion or dispersion of 4 and 15 percent by weight of a free-flowing water soluble or emulsifiable pulverulent product selected from the group consisting of fats and fatty oils of vegetable or animal origin, mineral oils, paraffin waxes having softening points of from 30° to 180° C., chlorinated paraffins, mineral fats, fatty alcohols, fatty acids, fatty amines and condensation products of these substances having a non-solid consistency, such substances being of the type employed as a leather fatting agent.

More especially, the present invention involves the treatment of a leather with a leather fatting agent comprising a solution, emulsion or dispersion of between 4 and 15 percent by weight of a free-flowing water soluble or emulsifiable pulverulent product from one or more substances having a liquid or pasty consistency produced by drying an aqueous solution or dispersion of a mixture of one or more of such substances together with a carrier composition having the dry weight analysis of:

(a) from 0.1 to 35% of an inorganic or organic water-soluble salt or a mixture thereof, (b) from 0.1 to 90% of albumin, an albumin derivative or a mixture thereof, and (c) from 0.1 to 70% of a mono-, oligo- or polysaccharide, a derivative thereof or a mixture thereof.

The present invention is based upon the finding that certain fats or oils can be readily formed into a free-flowing water-soluble or emulsifiable pulverulent form. In such form the free-flowing material can readily be dissolved in water to form an aqueous solution thereof or the same can be placed in water to form an emulsion thereof. It has been surprisingly found that the resultant solution, emulsion or dispersion functions particularly well as a leather fatting agent as will appear below. The reason for this phenomenon is not entirely understood. However, it has been observed, as seen from the comparative examples appended hereto, that these synthetic leather fatting substances outperform the prior art types of animal oils, mineral and vegetable oils previously used in the fatliquoring operation.

The fatliquoring operation is generally performed by contacting the leather with between 20 and 150 liters of solution, emulsion or dispersion of the free-flowing pulverulent product having a non-solid consistency per 100 kilograms of leather (shaved weight). The liquid vehicle employed in the leather fatting agent is generally water although the following substances can also be employed: Mono- and polyfunctional water-soluble alcohols such as methanol, ethanol, isopropanol, normal propanol, and ethylene glycol. Polyglycols such as polyethylene glycols. Generally speaking, the free-flowing pulverulent product is present in the solution, suspension or dispersion in an amount between 4 and 15 percent by weight. The leather fatting agent remains in contact with the leather for a period of time of between 20 and 90 min. while the same is maintained at a temperature between 20° and 70° C. Thereafter, the leather can be removed from the fatliquoring solution. Generally speaking, an excess of 80% of the active agent of the leather fatting agent is absorbed into the leather.

DESCRIPTION OF SPECIFIC EMBODIMENTS

One aspect of the present invention involves the formation of a free-flowing pulverulent product derived from materials having a liquid or pasty consistency, especially fatty, oily and/or waxy substances which are water soluble or which can be emulsified to form aqueous vehicles. Particular consideration is given to those non-edible substances heretofore employed in the fatting of leather. Amongst such fatty, oily and/or waxy substances, there may be mentioned, in particular, fats and oils of vegetable or animal origin; mineral oils, especially those having a viscosity lower than 20° Engler at 50° C.; paraffin waxes having softening points of from 30° to 180° C., especially from 30° to 65° C. and also derivatives of these paraffin waxes, for example, chlorinated paraffins; mineral fats or other petro chemicals and also derivatives of these compounds such as, for examples, fatty alcohols, fatty acids, fatty amines, condensation products of these substances or reaction products obtained by other suitable methods. Such substances, which are water-soluble or emulsifiable, are used, for example, in the treating of textiles, in the treatment of leather especially pursuant to the present invention as leather fatting agents; in working of metals, for example, as drilling oils or lubricating oils; as adjuvants in the manufacture or treatment of paper; in mining, for example, for combating dust; and also generally as emulsifiers and dispersants.

The aforesaid substances in the leather fatting agent of the invention are used alone or in admixture with one another and are most commonly available in a liquid or pasty condition, partly because they inherently possess such a consistency, and partly because, owing to their method of manufacture, the contain a more or less large content of water.

It has been heretofore proposed to bring such substances into a dry state by adding very finely divided silicic acid which has been obtained pyrogenically. This method does result in dry products, but it has the considerable disadvantage that silicic acid is water-insoluble so that the resulting products cannot be used for many purposes. The use of the products is further limited by their weakly acidic nature caused by the presence of the silicic acid. More especially, it cannot be used as a leather fatting agent.

The invention is based on the discovery that pulverulent free-flowing compositions derived from liquid or pasty substances, especially fatty, oily and waxy substances, can be obtained by drying aqueous solutions or dispersions containing one or more of the aforesaid substances togehter with a carrier composition having the dry weight analysis of
  (a) from 0.1 to 35% of one or more inorganic and/or organic salts,
  (b) from 0.1 to 90% of albumin, albumin derivatuves or mixtures thereof,
  (c) from 0.1 to 70% of mono-, oligo- or polysaccharides and/or their derivatives as well as mixtures thereof,
and, optionally,
  (d) from 0 to 5% of fillers, anti-caking agents, builders, or mixtures thereof.

The inorganic and/or organic salt component (a) is preferably present in an amount of from 5 to 30%, especially from 12 to 25%, of the carrier composition. An inorganic salts there may especially be mentioned the chlorides, sulphates, carbonates and phosphates of alkali metals, and also alkaline earth metals, provided that they are soluble. Also the chlorides and sulphates of aluminium, chromium and zirconium may be used, either alone or in admixture with the aforesaid alkali metal or alkaline earth metal salts, provided that the latter do not form insoluble compounds with said chlorides and sulphates.

As organic salts there may especially be mentioned soluble alkali metal and alkaline earth metal salts of monobasic or polybasic carboxylic acids of low molecular weight, preferably not greater than 200, which may contain further functional groups such as hydroxyl, amino, amido, mercapto or also disulphide groups. Especially suitable are the salts of formic acid, acetic acid, glycolic acid, lactic acid, thioglycolic acid, citric acid and phthalic acid.

When mixtures of organic or inorganic salts are used the mixtures must be water-soluble.

The albuminous component (b) is preferably present in an amount of from 15 to 50%, especially from 20 to 25%, of the carrier composition. As albuminous substances there are used those which alone and together with the aforesaid inorganic and/or organic salts do not lead to insoluble products. Albuminous substances that fulfill this requirement, are, for example, milk albumin, hydrolysates of insoluble albuminous substances of plant or animal origin, for example, casein, collagen and leguminous albumins.

The saccharide component (c) is preferably present in an amount of from 2 to 50%, especially from 10 to 40%, of the carrier composition. Amongst suitable monosaccharides there may be mentioned pentaerythritol, glucose, mannose, fructose, galactose, and amino-derivatives thereof, especially, for example, glucosamine. As disaccharides there may be mentioned, for example, saccharose and lactose, and as polysaccharides soluble starches of various origins and also hydrolysates thereof, provided that they contain more than two mono-saccharide units.

Amongst suitable fillers, anti-caking agents and builders there may be mentioned, for example, silicon dioxide, aluminium oxide, talcum, bentonite and kaolin. The final dried product and the aqueous solutions or dispersions from which they are obtained may also contain other adjuvants which, although not essential to the formation of the product, are desired for its intended use. Amongst such adjuvants there may be especially mentioned, for example, dyestuffs, tanning agents, disinfectants and preserving agents as well as mixtures thereof. These further adjuvants may be incorporated either into the aqueous solution or dispersion which is to be dried or into the dried product.

The carrier compositions can be formulated as desired but especially suitable carrier compositions falling within the specific analysis can readily be obtained from whey, skim milk and concentrates thereof, if desired after pH adjustment and/or the incorporation of other materials, e.g. fillers.

In order to convert the aqueous solutions or dispersions of the fatty, oily and/or waxy substances and the above carrier compositions into pulverulent, free-flowing compositions various drying methods may be used, including, for example, drying on a roller and freeze-drying. Spray-drying has been found to be especially advantageous.

The ratio of the carrier composition to the liquid or pasty substance may vary within wide limits, and is influenced by the drying method used. It is, therefore, recommended in each case to determine the optimum mixing ratio by making tests. In general, however, the dried pulverulent powders are prepared from aqueous solutions or dispersions containing from 10 to 80% by weight, preferably from 25 to 50% by weight, of the non-solid substance to be dried, i.e. the fatty, oily and/or waxy substance, and from 20 to 60% by weight, preferably 30 to 50% by weight, of the carrier composition. The aqueous solutions or dispersions which are dried to produce the final product may be formulated in any desired manner. For example, the liquid or pasty substance can be incorporated into an aqueous solution or dispersion of the carrier composition which is then dried. Alternatively the liquid or pasty substance can be prepared as an aqueous solution or dispersion which is then incorporated with the aqueous solution or dispersion of the carrier composition. In some cases it may even be desirable to incorporate some or all of the components of the carrier composition as solids into an aqueous solution or dispersion containing the other constituents.

If the basic liquid or pasty substance is such that it may be difficult to incorporate it in an aqueous solution or dispersion then it may be appropriate to increase its water-solubility or to make it emulsifiable by known methods, for example, by the incorporation of one or more surfactants or wetting agents.

The following examples illustrate the manufacture of various pulverulent, free-flowing products employed pursuant to the present invention:

EXAMPLE 1

563 grams of a chlorinated paraffin sulphonate, prepared as described in Example 1 of French Pat. No. 1,533,247, are mixed with 1375 grams of an acid whey concentrate neutralized with caustic soda solution and having a solids content of 40%, and the mixture is subjected to a spray-drying process. There are obtained about 1000 grams of a white, free-flowing powder.

EXAMPLE 2

500 grams of a chlorinated paraffin sulphonate, prepared as described in Example 2 of French Pat. No. 1,533,247, are mixed with 1500 grams of a whey concentrate adjusted with ammonia to a pH-value of 8.0 and having a solids content of 40%, and the mixture is subjected to a spray-drying process. There are obtained about 1000 grams of a white, free-flowing powder.

EXAMPLE 3

750 grams of a chlorinated paraffin sulphonate, prepared as described in Example 3 of French Pat. No. 1,533,247, are mixed with 2000 grams of a skim milk concentrate of 20% strength adjusted to a pH-value of 8.5 with caustic soda solution, and the mixture is subjected to a spray-drying process. There are obtained about 1000 grams of a pale yellow, free-flowing powder.

EXAMPLE 4

695 grams of a sulphonated sperm oil prepared by a known method and having the following characteristics:
pH-value of an aqueous solution of 10% strength=7.5
total fat=63%
organically combined $SO_3$=6%
active substance=72%,
are mixed with 1250 grams of a whey concentrate neutralized with caustic soda solution and having a solids content of 40%, and the mixture is subjected to a spray-drying process. There are obtained about 1000 grams of a pale yellow, free-flowing powder.

EXAMPLE 5

910 grams of a sulphated castor oil (Turkey red oil) having the following characteristics:
fat content=37%
degree of sulphation=22%
cleavage=73%
and therefore a water content of 56% are mixed with 1500 grams of a whey concentrate neutralized with lime and having a solids content of 40%, and the mixture is subjected to a drying process. After pulverization, there are obtained about 1000 grams of a free-flowing powder.

EXAMPLE 6

952 grams of a sodium alkyl sulphonate (based on paraffin wax having a melting point of 48° to 50° C.) having the following characteristics:
pH-value of an aqueous solution of 10% strength=8 to 9
organically combined $SO_3$=6.5%
ash content=14%
water content=37%
are mixed with 870 grams of a skim milk concentrate having a solids content of 46% and 30 grams of a coagulated silicon dioxide, and the mixture is dried on a roller drier. After being ground, the product is mixed in a suitable manner with 20 grams of a pulverulent preserving agent.

EXAMPLE 7

765 grams of a sulphited wool fat prepared as described in Example 3 of German Auslegeschrift No. 1,068,251, are mixed with 2000 grams of a skim milk concentrate of 30% strength, and the mixture is subjected to spray-drying.

EXAMPLE 8

500 grams of an emulsion, which is prepared from 50% sperm oil/filtrate 7/9° C. and 8% of a cation-active emulsifier based on the acetate of a condensation product of two mols of oleic acid and one mol of dimethylamino-propylamine and stabilized by the addition of 1% of a fatty alcohol polyglycol ether based on commercial lauryl alcohol and ten mols of ethylene oxide, are mixed with 2333 grams of an acid whey concentrate of 30% strength, and the mixture is subjected to a spray-drying process. There are obtained about 1000 grams of a dry, free-flowing powder.

In addition to the free-flowing pulverulent products of liquid or pasty, consistency specified above for use as a component of the leather fatting agent, one can employ water-soluble or emulsifiable reaction products of oils and fats of vegetable or animal origin, mineral oils and fats, waxes and their derivatives such as fatty acids, fatty alcohols, fatty amides or fatty amines obtained by processes such as sulfonation, sulfating, sulfiting, ethoxylation or sulfochlorination, which materials can be used alone or in admixture with one another especially in the fatting of leather and furs. Reaction products of this type are, for instance, sulfated castor oil, sulfated sperm oil and the water-soluble products of wool fet, train or sperm oil obtained by treatment with bisulfites as described in German Auslegeschrift 1,068,251, as well as the reaction products of paraffin hydrocarbons which are obtained by sulfohalogenation and subsequent saponification, and the chloroparaffin sulfonates prepared in accordance with Example 2 of French Pat. No. 1,533,247.

The free-flowing pulverulent dried substance obtained by the method described above can contain between 10 and 80% by weight of fat or oil content. Generally speaking, this content can preferably be up to about 70% by weight. Aqueous solutions, emulsions or dispersions of the same are stable over a wide pH range of between 3 an 8. Therefore, they can be readily employed at the prevailing pH's in the treatment of leather and furs. They can be employed together with other additives customarily used in the preparation of leather and furs, in particular the fatting of leather or furs.

As such additives there should be mentioned inorganic salts, for instance, chlorides, sulfates, carbonates and phosphates of the alkali and alkaline earth metals, to the extent that they are water-soluble. Chlorides and sulfates of aluminum, chromium and zirconium can be used also, i.e., also mixed with the aforementioned alkali and alkaline earth metal salts, to the extent that they do not form any insoluble components therewith.

As organic salts there may be used the soluble alkali and alkaline earth metal salts of mono- or polybasic carboxylic acids of low molecular weight, which in turn may contain functional groups such as, for instance, hydroxy, amino, amido, mercapto or disulfide groups, up to a molecular weight of the carboxylic acids of about 200. In particular, the salts of formic acid, acetic acid, glycolic acid, lactic acid, thioglycolic acid, citric acid or phthalic acid are suitable. Mixtures of the organic and/or inorganic salts may also be used if they are water-soluble. Free acids of the aforementioned inorganic and organic salts can also be used as additives in accordance with the present invention. Additionally, dyes, tanning agents, disinfectants, preservatives, wetting agents and emulsifiers can also be used in the leather fatting agent, especially those employed in the leather industry. Under certain circumstances, vegetable, animal and mineral oils and fats in their original form or as water-insoluble reaction products may also be used as additives.

When these products, which were obtained by the drying process specified herein, from water-soluble or water-emulsifiable or dispersible reaction products from oils, fats, waxes or their derivatives and/or mixtures of these substances on the one hand and whey, whole and/or skimmed milk on the other hand, according to the invention excellent results are achieved in leather fatting, which go beyond the results obtained with customary leather fatting agents. These products exhibit in particular a considerably greater filling effect, greater grain stability, improved fat bonding in the leather and improved exhaustion of the fatting liquor than has been possible with the hitherto known processes.

In order to more fully illustrate the invention and the manner of practicing the same, the following exemples on leather fatting are set forth. The percent figures in the examples below refer to the treated hide in each case. The substances used in particular for retanning are commercially available products which are defined in more detail below.

1. CORIAGEN CR II is a polyphosphate distributed by the company Benckiser.
2. TANIGAN BL, PAK and OS are synthetic tanning agents which are marketed by Farbenfabriken Bayer AG and are condensation products of phenol or cresol sulfo acids.
3. BAYCHROM is a self-buffing chrome tanning agent distributed by Farbenfabriken Bayer AG.
4. RETINGAN R7 and R4B are anionic and cationic resp. resin tanning agents of Farbenfabriken Bayer AG.
5. BAYKANOL SL is a light-resistant auxiliary agent for dyeing and tanning leather, which is marketed by Farbenfabriken Bayer AG.

EXAMPLE 9

(A) Material: Two halves of a fully chrome tanned cow hide; pH 4.5; thickness 1.8–2.0 mm; boil-finished: 100%

| Rinsing: | 40° C. | 10 min. |
|---|---|---|
| 1st Retanning: | 80% water | |
| | 1% Coriagen CR II | |
| | 1% Tanigan PAK | |
| | pH of liquor approx. 5.6 | 30 min. |
| Feeding liquor: | 4% Baychrom A | 60 min. |
| | pH of liquor approx. 4.5 | |
| Dyeing after discharging liquor: | 1% Baygenal - brown LC5G (dilution ration 1:20) 2 installments a 5 min. | |
| | and another | 20 min. |
| 2nd Retanning: | 1% Tanigan BL | 20 min. |
| Feeding Liquor: | 3% Retingan R7 | |
| | 2% chestnut wood extract | |
| | 2% Tanigan OS | |
| | 2% Tanigan OS | |
| | pH of liquor approx. 4.5 | 45 min. |
| Rinsing: | at 60° C. | 5 min. |

The product is identified as product 1A.

(B) This leather was fatted according to the invention with a product of (1) a pulverulent, free-flowing mixture which was obtained by spray-drying from 70% woolfat-train sulfitate and 30% skimmed milk, and (2) a pulverulent, free-flowing mixture which was obtained by spray drying from 60% chloroparaffin sulfonate and 40% skimmed milk.

| Fatting: | 100% water | |
|---|---|---|
| | 2.9% product (1) | |
| | 3.4% product (2) | |
| | pH of liquor approx. 4.6 at 60° C. | 40 min. |
| Feeding liquor: | 0.5% Retingan R4B | 15 min. |
| | pH of liquor approx. 4.7 | |
| Rinsing: | at 20° C. | 1 min. |

Subsequently the leather was placed on a stand, water removed mechanically, dried in a vacuum for 2 min. at a plate temperature of 85° C., aired, treated with shavings, presoftened, aired and post-softened.

The product is identified below as product 1B.

(C) For comparison, the leather material obtained under 1(A) was fatted with a product of (1) woof fat—train sulfitate
(2) chloroparaffin sulfonate,
which were not spray dried with skimmed milk to yield a free-flowing powder.

| Fatting: | 100% water | |
| --- | --- | --- |
| | 4.1% wool fat - train sulfitate | |
| | 2.7% chloroparaffin sulfonate | |
| | pH of the liquor approx. 4.7 | |
| | at 60° C. | 40 min. |
| Feeding liquor: | 0.5% Retingan R4B | 15 min. |
| | pH of liquor approx. 4.7 | |
| Rinsing: | at 20° C. | 1 min. |

The subsequent treatment of the material was carried out as specified under 1B. The product is designated as product K.

The results after fatting are compared in Table 1.

Table 1

| | 1 B | 1 C |
| --- | --- | --- |
| Residual fat of liquor material g/ltr. | 0.28 | 0.52 |
| Extractable fat, % based on water content of 14% | 3.7 | 5.0 |
| Bulk (increase in thickness), mm based on starting material | 0.3 | 0 |

The fatted leather in accordance with 1(B) shows good softness and a better grain stability (firmness) than does the product 1C.

EXAMPLE 10

(A) Material: Two halves of a fully chrome tanned cow hide; pH 4.5; thickness 1.9–2.0 mm; boil-finished: 100%

| Rinsing: | at 40° C. | 5 min. |
| --- | --- | --- |
| Retanning: | 50% water 40° C. | |
| | 1.5% Coriagen CR II | 30 min. |
| | 4% Retingan R7 | 20 min. |
| | 6% Baychrom A | 60 min. |
| | pH of liquor approx. 4.6 | |
| Rinsing: | at 60° C. | 10 min. |

Fatting was done with a product (a) which was obtained by spray drying a mixture of 70% wool fat—train sulfitate and 30% skimmed milk.

| (B) | Dyeing: | 100% water 60° C. | |
| --- | --- | --- | --- |
| | | 1% Baykanol SL | 5 min. |
| | Feeding liquor: | 1% Baygenal brown LC5G | 15 min. |
| | Feeding liquor: | 5.8% product (a) | 40 min. |
| | | pH of liquor approx. 5.0 | |
| | Feeding liquor: | 0.5% formic acid | |
| | | (dilution ration 1:10) | 10 min. |
| | | pH of liquor approx. 4.0 | |
| | Rinsing: | at 20° C. | 2 min. |

Subsequently the leather was placed on a stand, dried in a vacuum for 3½ min. at a plate temperature of 90° C., aired, treated with shavings, presoftened, air and post-softened.

(C) Fatting was done with pure wool fat-train sulfitate.

| Dyeing: | 100% water 60° C. | |
| --- | --- | --- |
| | 1% Baykanol SL | 5 min. |
| Feeding liquor: | 1% Baygenal brown LC5G | 15 min. |
| Feeding liquor: | 8.2% wool fat-train sulfitate | |
| | (dilution ration 1:4) | 40 min. |
| | pH of liquor approx. 4.5 | |
| Feeding liquor: | 0.5% formic acid | |
| | (dilution ration 1:10) | 10 min. |
| | pH of liquor approx. 3.5 | |
| Rinsing: | at 20° C. | 2 min. |

Thereupon, the material was treated further as specified under 2B.

The results after fatting are compared in Table 2.

Table 2

| | 2 B | 2 C |
| --- | --- | --- |
| Residual fat in liquor material g/ltr. | 0.32 | 0.32 |
| Extractable fat, %, based on water content of 14% | 4.2 | 5.4 |
| Bulk (increase in thickness), mm, based on starting material | 0.3 | 0 |

The fatted leather in accordance with 2(B) shows good softness and a better grain stability than that in accordance with 2(C).

EXAMPLE 11

(A) Material: Two halves of a fully chrome tanned cow hide; pH 4.3; thickness 2.0–2.1 mm; boil-finished: 100%

| Rinsing: | at 40° C. | 5 min. |
| --- | --- | --- |
| Retanning: | 50% water 40° C. | |
| | 1.5% Coriagen CR II | 20 min. |
| | pH of liquor approx 4.9 | |
| Feeding liquor: | 4% Retingan R7 | 20 min. |
| | pH of liquor approx. 6.4 | |
| Feeding liquor: | 6% Baychrom A | 60 min. |
| | pH of liquor approx. 4.0 | |
| Rinsing: | at 60° C. | 5 min. |

(B) Fatting was done with a product (b) which was obtained by spray drying a mixture of 60% chloroparaffin sulfonate and 40% skimmed milk.

| Dyeing: | 100% water 60° C. | |
| --- | --- | --- |
| | 1% Baykanol SL | 5 min. |
| Feeding liquor: | 1% Baygenal brown LC5G | 15 min. |
| Feeding liquor: | 6.8% product (b) | 40 min. |
| | pH of liquor approx. 4.4 | |
| Feeding liquor: | 0.5% formic acid | |
| | (dilution ration 1:10) | 10 min. |
| | pH of liquor approx. 3.6 | |
| Rinsing: | at 20° C. | 1 min. |

The leather was placed on a stand, dried in a vacuum for 3 min. at a plate temperature of 80° C., aired, treated with shavings, presoftened, aired and post-softened.

(C) Fatting was done with pure chloroparaffin sulfonate.

| Dyeing: | 100% water 60° C. | |
| --- | --- | --- |
| | 1% Baykanol SL | 5 min. |
| Feeding liquor: | 1% Baygenal brown LC5G | 15 min. |
| Feeding liquor: | 5.4% chloroparaffin sulfonate | |
| | (dilution ration 1:4) | 40 min. |
| | pH of liquor approx. 4.4 | |
| Feeding liquor: | 0.5% formic acid | |
| | (dilution ration 1:20) | 10 min. |

Subsequently, the material was further treated as specified under 3B.

The results after fatting are compared in Table 3.

Table 3

|  | 3 B | 3 C |
|---|---|---|
| Residual fat in liquor material g/ltr. | 0.73 | 1.4 |
| Extractable fat, %, based on water content of 14% | 3.8 | 4.6 |
| Bulk (increase in thickness), mm, based on starting material | 0.3 | 0 |

The fatted leather according to 3(B) shows good softness and a better grain stability than the one according to 3(C).

EXAMPLE 12

(A) Material: Two halves of a fully chrome tanned cow hide; pH 4.3; thickness 2.0–2.1 mm; boil-finished: 100%

| Rinsing: | at 40° C. | 10 min. |
|---|---|---|
| 1st Retanning: | 80% water 40° C. 1% Coriagen CR 1% Tanigan PAK pH of liquor approx. 4.7 | 30 min. |
| Feeding liquor: | 4% Baychrom A pH of liquor approx. 4.0 | 60 min. |
| Dyeing after discharging liquor: | 1% Baygenal brown LC5G (dilution ration 1:20) | 20 min. |
| Feeding liquor: | 1% Tanigan BL | 10 min. |
| 2nd Retanning: | 2% chestnut wood extract 3% Retingan R7 2% Tanigan OS pH of liquor approx. 4.2 | 45 min. |
| Rinsing: | at 60° C. | 5 min. |

(B) Fatting was done with the mixture of a product which was obtained by spray drying a mixture of
(1) 60% chloroparaffin sulfonate and 40% skimmed milk, as well as with
(2) chloroparaffin (20–22 C-atoms and 40% Cl).

| Fatting: | 100% water 60° C. 5.4% product (1) 0.8 product (2) | 40 min. |
|---|---|---|
| Feeding liquor: | 0.5% Retingan R4B pH of liquor approx. 4.5 | 15 min. |
| Rinsing: | at 20° C. | 1 min. |

The leather was placed on a stand, dried in a vacuum for 3 min. at a plate temperature of 80° C., aired, treated with shavings, presoftened, aired and post-softened.

(C) Fatting of the leather was done with a mixture of pure
(1) chloroparaffin sulfonate, and
(2) chloroparaffin (20–22 C-atoms and 40% Cl).

| Fatting: | 100% 60° C. 4.4% product (1) 0.8% product (2) (dilution ration 1:4) pH of liquor approx. 4.8 | 40 min. |
|---|---|---|
| Feeding liquor: | 0.5% Regingan R4B pH of liquor approx. 4.3 | 15 min. |
| Rinsing: | at 20° C. | 1 min. |

The leather was further treated as specified under 4B. The results after fatting are compared in Table 4.

Table 4

|  | 4 B | 4 C |
|---|---|---|
| Residual fat in liquor material g/ltr. | 0.7 | 1.1 |
| Extractable fat, %, based on water content of 14% | 4.4 | 4.9 |
| Bulk (increase in thickness), mm, based on starting material | 0.3 | 0 |

The leather fatted according to 4B shows good softness and a better grain stability than that according to 4C.

What is claimed is:

1. A leather fatting agent comprising an aqueous solution, emulsion or disperson prepared by dissolving, emulsing or dispersing in water between 4 and 15% by weight of a normally free-flowing pulverulent product from at least one substance having a non-solid consistency, said pulverulent product being in admixture with a carrier composition wherein said carrier composition is 20–90% by weight of the mixture of carrier composition and free-flowing pulverulent product, said substance having a non-solid consistency being a fat or oil of vegetable or animal origin, a mineral oil, a paraffin wax having a softening point of from 30° to 180° C., a chlorinated paraffin, a mineral fat, a fatty alcohol, a fatty acid, a fatty amine or a reaction product of these substances which has a non-solid consistency, said carrier composition comprising whey, whole or skimmed milk and having the dry weight analysis of:
   (a) from 0.1 to 35% of an inorganic or water-soluble salt which is a water-soluble chloride, sulfate, carbonate or phosphate of an alkali or alkaline earth metal or a chloride or a water-soluble chloride or sulfate of aluminum, chromium or zirconium or a water-soluble alkali metal or alkaline earth metal salt of a mono-basic or a poly-basic carboxylic acid having a molecular weight not greater than 200 or a mixture thereof,
   (b) from 0.1 to 90% of an albumin, and
   (c) from 0.1 to 70% of a mono-, oligo- or poly-saccharide or a mixture thereof, said composition having between 4 and 15% by weight of said normally free-flowing pulverulent product based on the weight of the entire leather fatting agent including carrier composition and water.

2. A leather fatting agent according to claim 1 wherein the pulverulent product is non-edible.

3. A leather fatting agent according to claim 2 wherein the substance is a mineral oil having a viscosity lower than 20° Engler at 50° C.

4. A method for fatting leather which comprises contacting leather with between 20 and 100 liters of the composition of claim 1 per 100 kilograms of leather.

5. A method for fatting leather which comprises contacting leather at a temperature between 20° and 70° C. with between 20 and 150 liters of the composition of claim 1 per 100 kilograms of leather for between 20 and 90 min. and thereafter removing the leather therefrom.

6. A method for fatting leather which comprises contacting the leather at a temperature between 20° and 70° C. with the leather fatting agent of claim 3, said composition containing between 4 and 15% by weight of free-flowing pulverulent product based upon the weight of the entire leather fatting agent including carrier composition and water.

7. A method according to claim 6 wherein the leather fatting agent additionally contains an effective amount of a dye, a tanning agent, a disinfectant, a preservative, a wetting agent or an emulsifier.

8. A method according to claim 7 wherein the additive is a water-soluble inorganic salt, the inorganic salt is selected from the group consisting of chlorides, sulfates, carbonates and phosphates of alkali or alkaline earth metals.

9. A method according to claim 7 wherein the additive is a water-soluble organic salt selected from the group consisting of soluble alkali and alkaline earth metal salts of mono- and poly-basic carboxylic acids of molecular weight less than 200.

10. A method according to claim 9 wherein the organic salt is selected from the group consisting of water-soluble salts of formic acid, acetic acid, glycolic acid, lactic acid, thioglycolic acid, citric acid and phthalic acid.

11. A leather fatting agent according to claim 1 wherein said carrier composition comprises whey.

12. A leather fatting agent according to claim 1 wherein said carrier composition comprises whole milk components.

13. A leather fatting agent according to claim 1 wherein said carrier composition comprises skimmed milk components.

14. A method according to claim 4 wherein said carrier composition comprises whey.

15. A method according to claim 4 wherein said carrier composition comprises whole milk components.

16. A method according to claim 4 wherein said carrier composition comprises skimmed milk components.

* * * * *